(12) United States Patent
Kwon et al.

(10) Patent No.: US 12,534,084 B2
(45) Date of Patent: Jan. 27, 2026

(54) METHOD AND APPARATUS FOR DETERMINING BEHAVIOR BASED ON DEEP REINFORCEMENT LEARNING FOR AUTONOMOUS VEHICLE MERGING STRATEGY

(71) Applicant: FOUNDATION OF SOONGSIL UNIVERSITY-INDUSTRY COOPERATION, Seoul (KR)

(72) Inventors: Min Hae Kwon, Seoul (KR); Jae Hwi Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 21 days.

(21) Appl. No.: 18/766,357

(22) Filed: Jul. 8, 2024

(65) Prior Publication Data
US 2025/0263075 A1    Aug. 21, 2025

(30) Foreign Application Priority Data

Feb. 16, 2024  (KR) .................. 10-2024-0022573

(51) Int. Cl.
*B60W 30/18* (2012.01)
*B60W 40/04* (2006.01)
*B60W 60/00* (2020.01)

(52) U.S. Cl.
CPC ...... *B60W 30/18163* (2013.01); *B60W 40/04* (2013.01); *B60W 60/001* (2020.02); *B60W 2556/45* (2020.02)

(58) Field of Classification Search
CPC .......... B60W 30/18163; B60W 40/04; B60W 60/001; B60W 2556/45; B60W 30/18009; B60W 40/02; G06N 3/08; G08G 1/0968
See application file for complete search history.

(56) References Cited

U.S. PATENT DOCUMENTS

2021/0001857 A1*  1/2021  Nishitani ............ B60W 60/001

FOREIGN PATENT DOCUMENTS

| CN | 116215532 A | 6/2023 |
|---|---|---|
| KR | 10-2206398 B1 | 1/2021 |

(Continued)

OTHER PUBLICATIONS

Office Action mailed on Oct. 16, 2025, issued to Korean Patent Application No. 10-2024-0022573.

*Primary Examiner* — Ashley L Redhead, Jr.
(74) *Attorney, Agent, or Firm* — Stein IP, LLC

(57) ABSTRACT

A deep reinforcement learning-based vehicle action decision apparatus for merging strategy of an autonomous vehicle in an on-ramp merging zone is disclosed. The deep reinforcement learning-based vehicle action decision apparatus comprises an information observation unit for collecting observation information from a sensing module or roadside unit (RSU) of an autonomous vehicle; a policy execution unit for deciding on a current action, including acceleration control and lane change of the autonomous vehicle, based on the current observation information and policy; and a reward determination unit for determining a reward according to the current observation information, the current action, and the next observation information according to the current action, wherein reward in the reward determination unit is determined through a reward term related to speed, lane change, safety distance compliance, and an accident of the autonomous vehicle and a merge reward term related to merge of an autonomous vehicle in the on-ramp merging zone.

13 Claims, 12 Drawing Sheets

(56) References Cited

FOREIGN PATENT DOCUMENTS

| KR | 10-2022-0102694 A | 7/2022 |
| KR | 10-2023-0127946 A | 9/2023 |

\* cited by examiner

METHOD AND APPARATUS FOR DETERMINING BEHAVIOR BASED ON DEEP REINFORCEMENT LEARNING FOR AUTONOMOUS VEHICLE MERGING STRATEGY

CROSS-REFERENCE TO RELATED APPLICATIONS

This application claims the benefit of Korean Application No. 10-2024-0022573 filed on Feb. 16, 2024, in the Korean Intellectual Property Office. All disclosures of the document named above are incorporated herein by reference.

TECHNICAL FIELD

The present invention relates to a vehicle action decision method and apparatus based on deep reinforcement learning for merging strategies of autonomous vehicles.

BACKGROUND ART

With recent rapid developments in the field of artificial intelligence, research on autonomous driving technology is being conducted in various fields.

Conditional autonomous driving technology has recently been commercialized, and it is expected that a level 4 or higher fully autonomous driving system that does not require driver intervention will be introduced soon.

However, there are still limitations in technological completeness in the development of autonomous driving technology for highway ramp sections.

Because the autonomous driving environment in the ramp section is uncertain and dynamic, it requires flexible and precise decision-making ability compared to other road structures.

On roads that require merging, many risk factors are difficult to predict, such as sudden vehicle stops and lane changes.

RELATED ART REFERENCES

Korean Patent Application Publication No. 10-2022-0102694
Korean Patent Application Publication No. 10-2023-0127946

DISCLOSURE

Technical Problem

In order to solve the problems of the prior art described above, the present invention proposes a deep reinforcement learning-based vehicle action decision method and apparatus for the merging strategy of autonomous vehicles that allows autonomous vehicles to successfully pass the on-ramp merging zone where vehicle collisions frequently occur due to sudden stops and lane changes.

Technical Solution

In order to achieve the above-described object, according to one embodiment of the present invention, a deep reinforcement learning-based vehicle action decision apparatus for merging strategy of an autonomous vehicle in an on-ramp merging zone comprises an information observation unit for collecting observation information from a sensing module or roadside unit (RSU) of an autonomous vehicle; a policy execution unit for making a decision regarding a current action, including acceleration control and lane change of the autonomous vehicle, based on the current observation information and policy; and a reward determination unit for determining a reward according to the current observation information, the current action, and the next observation information according to the current action, wherein reward in the reward determination unit is determined through a reward term related to speed, lane change, safety distance compliance, and an accident of the autonomous vehicle and a merge reward term related to merge of an autonomous vehicle in the on-ramp merging zone The observation information may comprise at least one of the absolute speed of the autonomous vehicle, the relative speed between the closest leader vehicle in front and the closest follower vehicle in rear among vehicles in each lane that the autonomous vehicle can observe, the relative distance between the leader vehicle and the follower vehicle, vehicle density for each lane within front observation range of the autonomous vehicle, and presence or absence of a lane within front observation range of the autonomous vehicle.

The merge reward term may be determined using the remaining drivable distance from an on-ramp where the autonomous vehicle is located to a merging point and traffic density.

The closer the autonomous vehicle merges to the merging point, the reward determination unit may give a higher penalty as it is considered a delayed merge.

The reward determination unit may alleviate the penalty using a traffic density weight according to the traffic density of the main lane of the on-ramp merging zone.

The traffic density weight may be determined using at least one of the length of the on-ramp merging zone, the number of vehicles driving in the main lane of the on-ramp merging zone, the length of a vehicle belonging to a vehicle set in the main lane of the on-ramp merging zone, and minimum safety distance.

The merge reward term may be defined by the following equation, $$R_{t,5} = \begin{cases} \mu_{t+1} \times \zeta_{t+1,\hat{n}}, & \zeta_{t+1,\hat{n}} < 0 \\ 0, & \zeta_{t+1,\hat{n}} \geq 0 \end{cases} \quad \text{[Equation]}$$

wherein $\zeta_{t+1,\hat{n}} \in \zeta_{t=1}$ is the remaining drivable distance from an on-ramp where the autonomous vehicle is located to a merging point and $\mu_{t+1}$ is traffic density weight.

The traffic density weight may be defined by the following equation, $$\mu_{t+1} = 1 - \left( \frac{\sum_{i=1}^{|C_{t+1,Y}|}(e_i + \delta_0)}{Y} \right) \quad \text{[Equation]}$$

wherein Y is the length of the on-ramp merging zone, $|C_{t+1,Y}|$ is the number of vehicles driving in a main lane of the on-ramp merging zone, $e_i$ is the length of the ith vehicle in a set of vehicles $|C_{t+1,Y}|$ in a main lane of the on-ramp merging zone, and $\delta_0$ is the minimum safety distance.

The learning of the policy may be performed by the autonomous vehicle itself or by a central server connected to multiple autonomous vehicles through a network.

When the learning of the policy is performed by the autonomous vehicle itself, the apparatus may further comprise a policy learning unit for updating the policy according to the collected current observation information, the current action, the next observation information, and experience information including the reward, and determining whether the number of learning times is met to learn the policy.

When the learning of the policy is performed by the central server, the apparatus may further comprise a policy communication unit for transmitting experience information including the collected current observation information, the current action, the next observation information, and the reward to the central server, and receiving a policy that the central server has learned using experience information received from the multiple autonomous vehicles.

According to another embodiment of the present invention, a deep reinforcement learning-based vehicle action decision apparatus for merging strategy of an autonomous vehicle in an on-ramp merging zone comprises a processor; and a memory connected to the processor, wherein the memory stores program instruction, when executed by the processor, configured to perform operations comprises collecting observation information from a sensing module or roadside unit (RSU) of an autonomous vehicle; making a decision regarding a current action, including acceleration control and lane change of the autonomous vehicle, based on the current observation information and policy; and determining a reward according to the current observation information, the current action, and the next observation information according to the current action, wherein reward is determined through a reward term related to speed, lane change, safety distance compliance, and an accident of the autonomous vehicle and a merge reward term related to merge of an autonomous vehicle in the on-ramp merging zone.

According to another embodiment of the present invention, a deep reinforcement learning-based vehicle action decision method for merging strategy of an autonomous vehicle in an on-ramp merging zone comprises collecting observation information from a sensing module or roadside unit (RSU) of an autonomous vehicle; making a decision regarding a current action, including acceleration control and lane change of the autonomous vehicle, based on the current observation information and policy; and determining a reward according to the current observation information, the current action, and the next observation information according to the current action, wherein the reward is determined through a reward term related to speed, lane change, safety distance compliance, and an accident of the autonomous vehicle and a merge reward term related to merge of an autonomous vehicle in the on-ramp merging zone.

Advantageous Effects

According to the present invention, there is an advantage that autonomous vehicles can smoothly merge in an on-ramp merging zone where vehicle collisions frequently occur due to sudden stops and lane changes.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
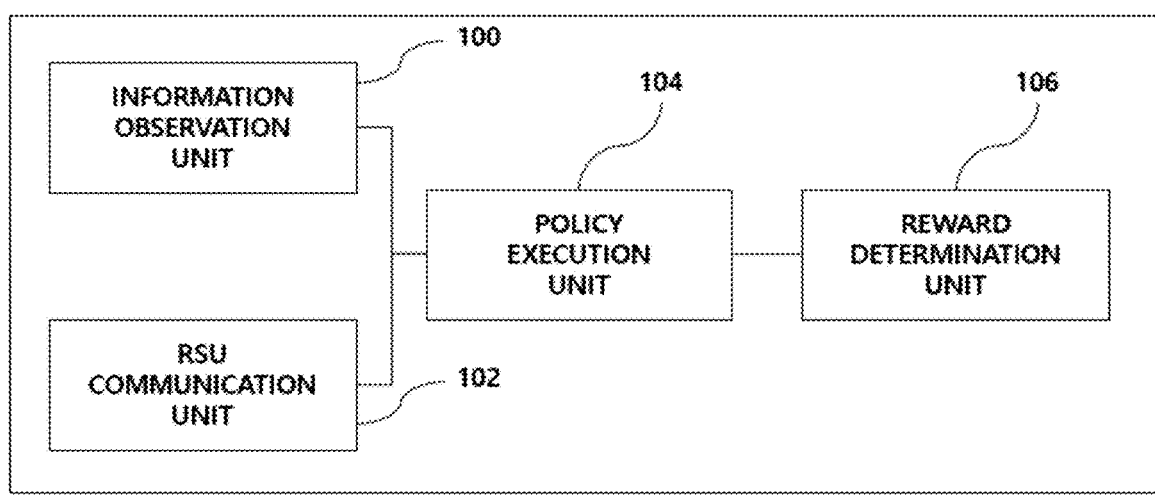
FIG. 1 is a diagram illustrating the configuration of a deep reinforcement learning-based vehicle action decision apparatus for a merging strategy of autonomous vehicles according to the present embodiment.

Since the present invention can make various changes and have various embodiments, specific embodiments will be illustrated in the drawings and described in the detailed description. However, this is not intended to limit the present invention to specific embodiments, and should be understood to include all changes, equivalents, and substitutes included in the spirit and technical scope of the present invention.

The terms used herein are only used to describe specific embodiments and are not intended to limit the invention. Singular expressions include plural expressions unless the context clearly dictates otherwise. In this specification, terms such as "comprise" or "have" are intended to designate the presence of features, numbers, steps, operations, components, parts, or combinations thereof described in the specification, but it should be understood that this does not exclude in advance the presence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope of maintaining the technical spirit of the present invention, and even if separate description is omitted, a plurality of embodiments may be re-implemented as a single integrated embodiment.

In addition, when describing with reference to the accompanying drawings, identical or related reference numerals will be given to identical or related elements regardless of the reference numerals, and overlapping descriptions thereof will be omitted. In describing the present invention, if it is determined that a detailed description of related known technologies may unnecessarily obscure the gist of the present invention, the detailed description will be omitted.

This embodiment proposes a system for learning and performing a driving policy (hereinafter referred to as policy) for a successful merging strategy in an on-ramp merging zone, and can be applied regardless of single and multiple autonomous driving environments.

Here, policy can be defined as a policy model or policy network that makes decisions (action decisions) for driving autonomous vehicles.

At this time, policy learning is performed through deep reinforcement learning, and includes the design of a Markov Decision Process (MDP) for this purpose.

In this embodiment, the decision-making of the autonomous vehicle may be actions related to acceleration control and lane change in the on-ramp merging zone.

FIG. 1 is a diagram illustrating the configuration of a deep reinforcement learning-based vehicle action decision apparatus for a merging strategy of autonomous vehicles according to the present embodiment.

As shown in FIG. 1, the apparatus according to the present embodiment may comprise an information observation unit 100, a roadside unit (RSU) communication unit 102, a policy execution unit 104, and a reward determination unit 106.

The configuration in FIG. 1 may be configured inside an autonomous vehicle, but is not necessarily limited thereto.

The information observation unit 100 collects observation information from a roadside unit (RSU) using the sensing module of the autonomous vehicle or the roadside unit communication unit 102.

Observation information may be information including at least part of state information about the surrounding environment, and if all information about the surrounding environment can be collected, observation information may be used in the same sense as state information.

The roadside unit communication unit 102 allows the autonomous vehicle to obtain information about the target vehicle through communication with the roadside unit when there is a vehicle that cannot be sensed through its own sensing module. At this time, information exchange between autonomous vehicle and roadside unit is done through V2I (Vehicle to Infrastructure). Additionally, the roadside unit may communicate with adjacent roadside units to obtain or transmit information about the target vehicle. Communication between roadside units is done through I2I (Infrastructure to Infrastructure).

In addition, policy learning for decision-making by the policy execution unit 104 can be performed by the autonomous vehicle itself (single autonomous vehicle environment) or by a central server connected to multiple autonomous vehicles through a network.

The policy execution unit 104 makes decisions regarding current actions, including acceleration control and lane changes of the autonomous vehicle, based on current observation information and policy.

The reward determination unit 106 determines the reward based on current observation information, current action, and next observation information according to the current action.

A reward is determined through reward terms related to the autonomous vehicle's speed, lane change, compliance with safety distance, and accidents, and merge reward terms related to the merge of autonomous vehicles in the on-ramp merging zone, which will be described in detail below.

Vehicle action decisions according to this embodiment are performed based on deep reinforcement learning, and the Markov Decision Process will be described in detail below.

In MDP, there is an assumption that an agent is fully observable of all state information in the environment.

However, in realistic environments such as autonomous driving, perfect observation of all state information is limited, so in this embodiment, a reinforcement learning problem is defined through POMDP (Partially Observable MDP), which makes decisions based on partial state information.

POMDP is defined as a tuple $\langle S, A, T, O, \Omega, R, \gamma \rangle$, where $s_t \in S$ means the state information of the road environment (state), $a_t \in A$ means the driving action of the autonomous driving agent, $T(s_{t+1}|s_t,a_t)$ means the state transition probability, and $o_t \in O$ means the observable information by the autonomous driving agent at a specific time point t in state $s_t$. In addition, $\Omega(o_t|s_t)$ means the observation probability, $R(s_t,a_t,s_{t+1})$ means the reward function, and $\gamma \in [0,1)$ means the discount factor over time.

Figure 2:
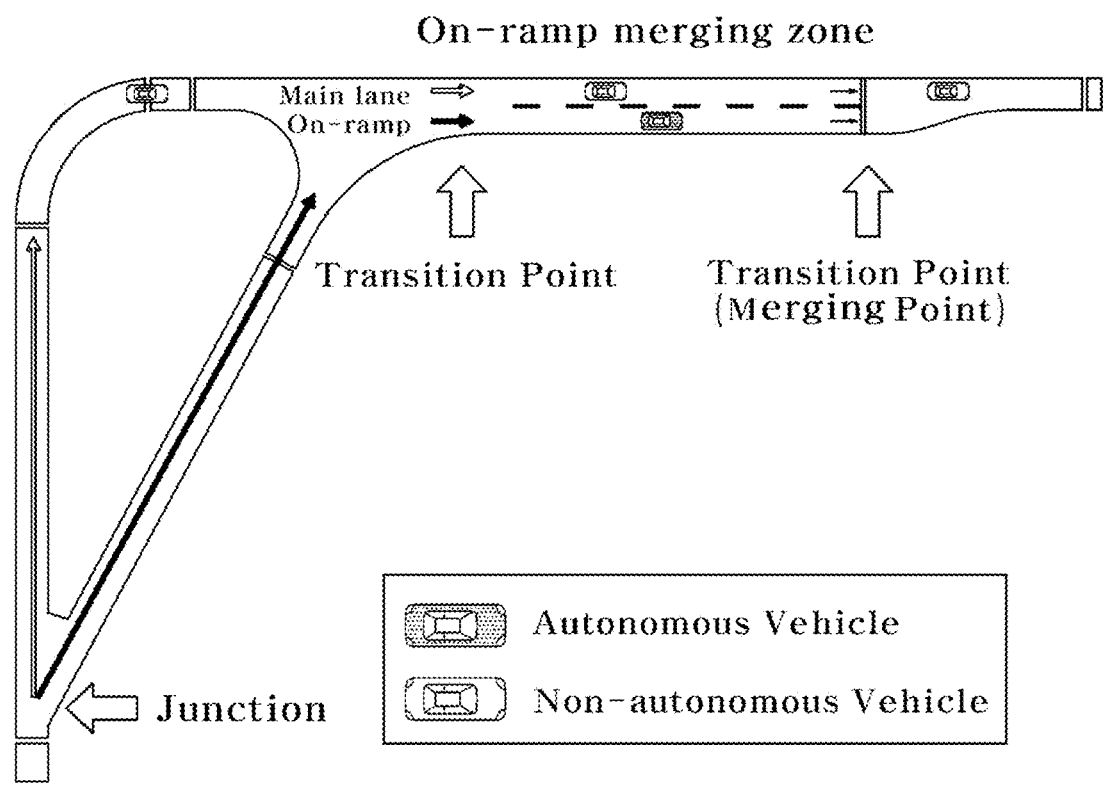
FIG. 2 is a diagram showing the structure of an on-ramp merging zone.

In the present embodiment, to learn the merging strategy policy in the on-ramp merging zone, a road structure including a transition point where the number of lanes on the road increases/decreases is considered, as shown in FIG. 2.

As shown in FIG. 2, the on-ramp merging zone is defined as the main lane, the on-ramp where the autonomous vehicle to merge is located, and the merging point where the main lane and the on-ramp merge, and the merging point can also be defined as a transition point.

Specifically, an environment in which a total of N vehicles $C=\{c_1, c_2, \ldots, c_N\}$ drive on a road with M transition points $\mathcal{M} =\{1,2, \ldots, M\}$ is considered.

In the relevant road environment, merging from the on-ramp to the main lane is essential, and an irregular road environment is created due to a decrease in traffic capacity due to a reduction in lanes.

In the present embodiment, an autonomous vehicle can safely and efficiently perform merging strategy policy learning in this environment.

In the present embodiment, an environment is considered in which an autonomous vehicle branches off at a junction and enters the on-ramp, and a non-autonomous vehicle enters the main lane without branching.

The set of vehicles $C=C_{NAV} \cup C_{AV}$ on the road comprises N−1 non-autonomous vehicles $C_{NAV}=\{c_i|i \neq N\}$ and 1 autonomous vehicle $$C_{AV} = \{c_i \mid i = N\}.$$

Here, road driving state information $s_t$ is defined as follows.

$$s_t=[v_t^T,p_t^T,k_t^T,d_t^T]^T$$

Here, $v_t=[v_{t,1},v_{t,2},\ldots,v_{t,N}]^T$ represents the absolute speed of all vehicles on the road and $p_t=[p_{t,1},p_{t,2},\ldots,p_{t,N}]^T$ represents the absolute positions of all vehicles.

In addition, $[k_{t,1},k_{t,2},\ldots,k_{t,N}]^T$ denotes the lane number of the road on which each vehicle is located, and $d_t=[d_{t,1}, d_{t,2},\ldots,d_{t,N}]^T$ denotes the distance to the nearest transition point for each vehicle.

In the present embodiment, a POMDP-based reinforcement learning problem is considered for agent decision-making through partial observation information.

Figure 3:
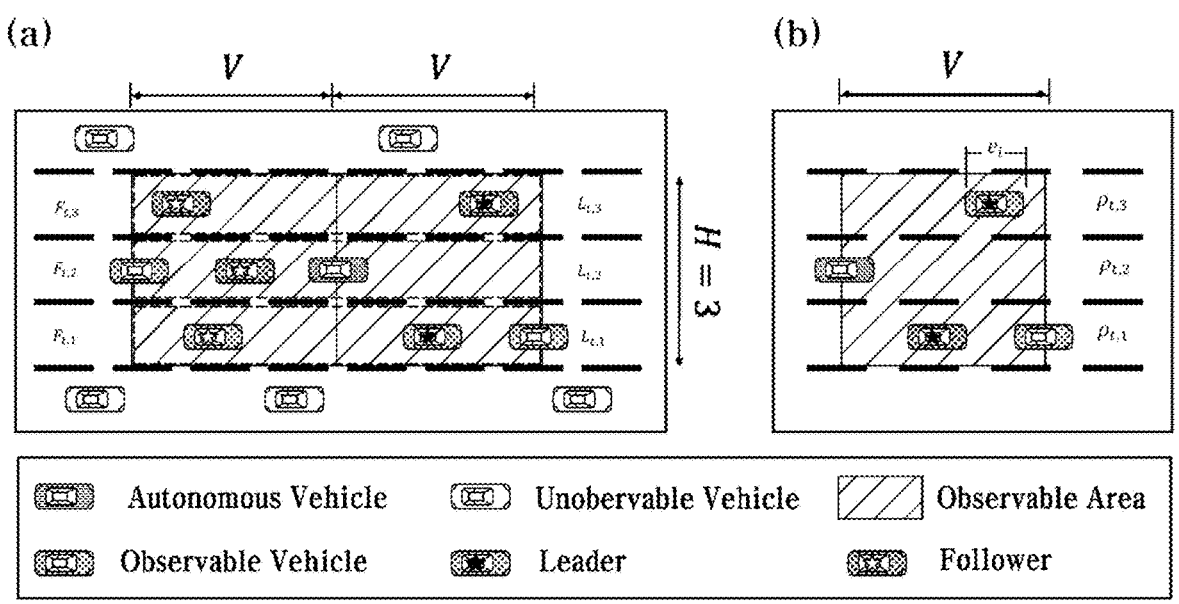
FIG. 3 is a diagram showing the observable area and traffic density according to the present embodiment.

FIG. 3 is a diagram showing the observable area and traffic density according to this embodiment.

Referring to FIG. 3a, the autonomous vehicle can observe a total of H lanes, including the located lane, and a distance of V forward and behind the absolute position of the agent, which is defined as an observable area.

Vehicles within the observable area are defined as observable vehicles and are denoted as a set $C_{t,obs}$.

At this time, $C_{t,obs}$ can be divided into a front vehicle set $L_t$ and a rear vehicle set $F_t$, and is defined as follows.

$$C_{t,obs} = L_t * \bigcup F_t,$$

where $$L_t = \bigcup_{h=1}^{H} L_{t,h},$$

$$F_t = \bigcup_{h=1}^{H} F_{t,h}$$

Here, $L_{t,h} \subset L_t$ and $F_{t,h} \subset F_t$ mean the front and rear vehicle sets within the observable area for each lane h.

At this time, in the set of vehicles observed for each front and rear lane, the front vehicle closest to the autonomous vehicle is defined as the leader vehicle leader $l_{t,h} \in L_{t,h}$, and the rear vehicle closest to the autonomous vehicle is defined as the follower vehicle follower $f_{t,h} \in F_{t,h}$.

The observation information $o_t \in O$ of an autonomous vehicle at time t is defined as follows.

$$o_t = [v_{t,N}, \Delta v_t^T, \Delta p_t^T, \rho_t^T, \zeta_t^T]^T$$

$v_{t,N}$ is the absolute speed of the autonomous vehicle.

$[\Delta v_{t,l_1}, \Delta v_{t,l_2}, \ldots, \Delta v_{t,l_H}, \Delta v_{t,f_1}, \Delta v_{t,f_1}, \ldots, \Delta v_{t,f_H}]^T$ is the relative speed between the leader vehicle and the follower vehicle in each lane that can be observed by the autonomous vehicle.

$[\Delta p_{t,l_1}, \Delta p_{t,l_2}, \ldots, \Delta p_{t,l_H}, \Delta p_{t,f_1}, \Delta p_{t,f_1}, \ldots, \Delta p_{t,f_H}]^T$ means the relative distance between the leader vehicle and the follower vehicle in each lane.

$\rho_t = [\rho_{t,1}, \rho_{t,2}, \ldots, \rho_{t,H}]^T$ represents the vehicle density for each lane within the front observation range of the autonomous vehicle.

Referring to FIG. 3b, the vehicle density $\rho_{t,h}$ in a specific lane h means the ratio of vehicles in that lane compared to the front observation range V.

$$\rho_{t,h} = \frac{\sum_{i=1}^{|L_{t,h}|}(\delta_0 + e_i)}{V}$$

Here, vehicle density is defined by the number of vehicles $|L_{t,h}|$ observed in a specific lane h, the length of the ith vehicle in that lane, and the minimum safe distance between vehicles $\delta_0$.

$\zeta_t = [\zeta_{t,1}, \zeta_{t,2}, \ldots, \zeta_{t,H}]^T$ indicates the presence or absence of a lane within the observation range ahead of the autonomous vehicle.

Figure 4:
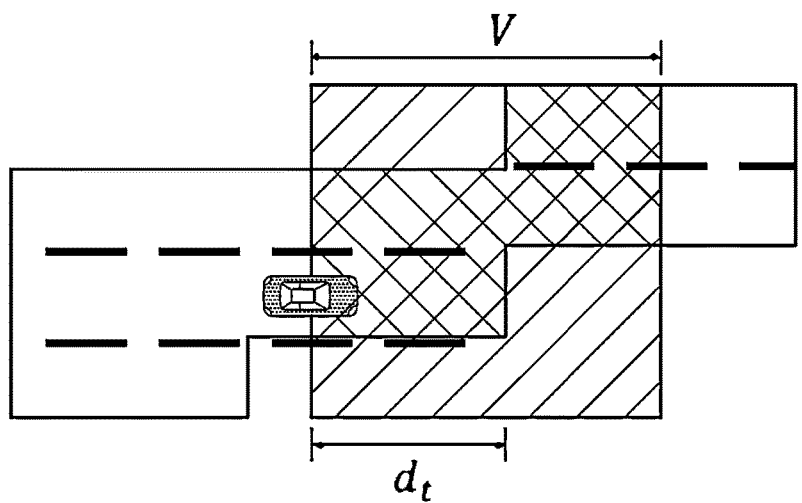
FIG. 4 is a diagram illustrating various types of the existence of a lane.

FIG. 4 is a diagram illustrating various types of existence of a lane.

Referring to FIG. 4, the existence of a lane is defined by the observable range V and the remaining distance $d_t$ to the transition point.

If a lane within the front observation range of an autonomous vehicle exists and then is cut off, it is defined as $d_t - V$, and if it expands, it is defined as $-(d_t - V)$.

In addition, if the lane is already connected based on the autonomous vehicle, it is defined as V, and if the lane does not exist, it is defined as $-V$.

The action of the autonomous vehicle at time t is as follows.

$$a_t = \{a_{t,acc}, a_{t,lc}\}$$

Here, $a_{t,acc}$ means acceleration control action, and $a_{t,lc}$ means lane change action.

Acceleration control action $a_{t,acc} \in [a_{min}, a_{max}]$ has values within a continuous range of minimum acceleration $a_{min}$ and maximum acceleration $a_{max}$.

Lane change action $a_{t,lc} \in \{-1, 0, 1\}$ has discrete values, and each value represents the lane change direction of the autonomous vehicle. Specifically, −1 indicates a lane change to the right, 1 indicates a lane change to the left, and 0 indicates lane-keeping action.

The reward $r_t$ at time t of an autonomous vehicle is defined in the form of a function $r_t = R(s_t, a_t, s_{t+1})$ for the current state (current observation information) $s_t$, current action $a_t$, and next state $s_{t+1}$ (next observation information according to the current action), and comprises a linear combination of each reward term and penalty term.

$$R(s_t, a_t, s_{t+1}) = \sum_{i=1}^{6} \eta_i R_{t,i}$$

Here, $R_{t,i \in \{1, \ldots, 6\}}$ means the reward term or penalty term, and $\eta_{i \in \{1, \ldots, 6\}}$ means the coefficient for each term.

The first term $R_{t,1}$ is a speed reward term regarding the speed $v_{t+1,N}$ of the autonomous vehicle at time t+1 due to the acceleration control action $a_{t,acc}$ of the autonomous vehicle at time t. The agent learns the action that does not exceed the speed limit $v_{limit}$ while driving close to the target speed $v^*$, and is defined as follows.

$$R_{T,1} = \begin{cases} \dfrac{v_{t+1,N}}{v^*}, & v_{t+1,N} \le v^* \\ \dfrac{v_{limit} - v_{t+1,N}}{v_{limit} - v^*}, & v_{t+1,N} > v^* \end{cases}$$

In the first reward term, the autonomous vehicle obtains the maximum positive reward when driving close to the target speed, and when it exceeds the target speed, the positive reward decreases linearly. Additionally, a penalty is imposed if driving exceeds the speed limit.

$R_{t,2}$ is a penalty term for meaningless lane changes, and is activated only when the autonomous vehicle performs a lane change action and is defined as follows.

$$R_{t,2} = |a_{t,lc}| \min\left(0, \Delta p_{t+1,\hat{l}} - \Delta p_{t,\hat{l}}\right)$$

Here, $\hat{l}$ refers to the leader vehicle in the same lane as the autonomous vehicle, $\Delta p_{t,\hat{l}}$ refers to the relative distance between the autonomous vehicle and the leader vehicle in the same lane at time t, and $\Delta p_{t+1,\hat{l}}$ refers to the relative distance between the autonomous vehicle and the leader vehicle in the same lane at the next time point (t+1).

At this time, if the relative distance after the lane change action is reduced compared to the relative distance before the lane change action ($\Delta p_{t+1,\hat{l}} > \Delta p_{t,\hat{l}}$), it is considered a meaningless lane change and a penalty is given.

Figure 5:
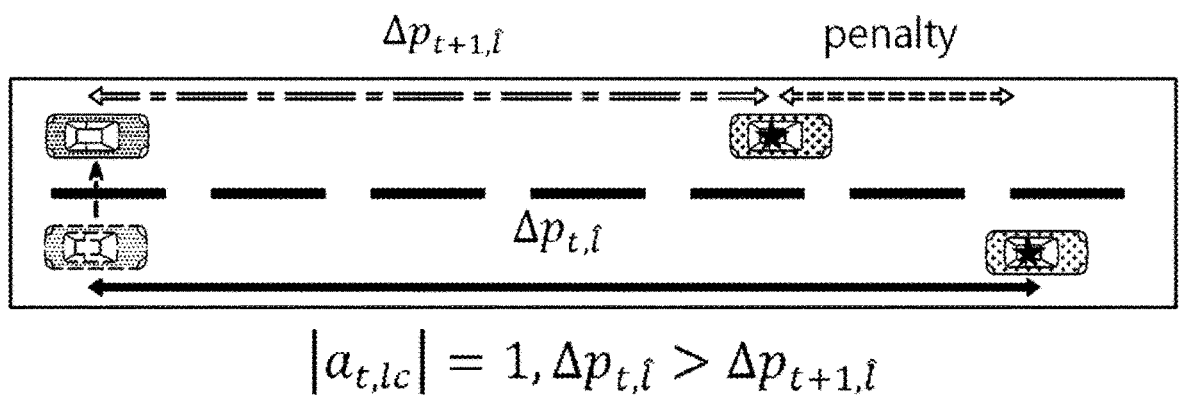
FIG. 5 is a diagram showing a case where a penalty is given after changing lanes.

FIG. 5 is a diagram showing a case where a penalty is given after changing lanes.

Autonomous vehicles maintain a safe distance between vehicles and learn safe driving action through $R_{t,3}$ and $R_{t,4}$.

$R_{t,3}$ guides the autonomous vehicle to drive without violating the safety distance $\delta_{t+1,\hat{l}}^*$ from the leader vehicle in the same lane, $R_{t,4}$ and guides the autonomous vehicle to change lanes without violating the safety distance $\delta_{t+1,\hat{f}}^*$ from the follower vehicle in the same lane.

Figure 6:
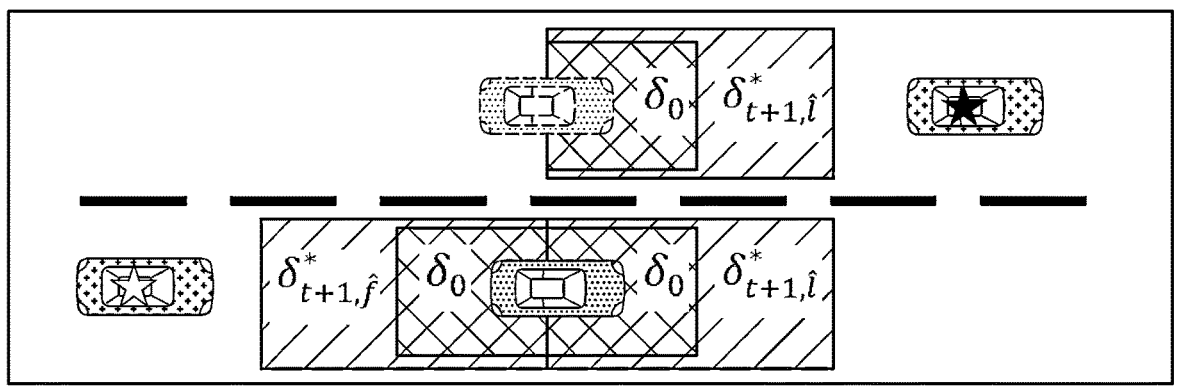
FIG. 6 is a diagram for explaining driving action for maintaining a safe distance between vehicles.

FIG. 6 is a diagram for explaining driving action for maintaining a safe distance between vehicles.

$R_{t,3}$ and $R_{t,4}$ are defined as follows.

$$R_{t,3} = \min\left[0, 1 - \left(\frac{\delta_{t+1,\hat{l}}^*}{\Delta p_{t+1,\hat{l}}}\right)^2\right]$$

$$R_{t,4} = |a_{t,lc}|\min\left[0, 1 - \left(\frac{\delta_{t+1,\hat{f}}^*}{\Delta p_{t+1,\hat{f}}}\right)^2\right]$$

Here, the safety distance $\delta_{t+1,\hat{l}}^*$ and $\delta_{t+1,\hat{f}}^*$ are defined as follows.

$$\delta_{t+1,\hat{l}}^* = \delta_0 + \max\left[0, v_{t+1,\hat{l}}\left(t^* + \frac{(v_{t+1,\hat{l}} - v_{t+1,N})}{2\sqrt{a_{max} \cdot a_{min}}}\right)\right]$$

$$\delta_{t+1,\hat{f}}^* = \delta_0 + \max\left[0, v_{t+1,\hat{f}}\left(t^* + \frac{(v_{t+1,\hat{f}} - v_{t+1,N})}{2\sqrt{a_{max} \cdot a_{min}}}\right)\right]$$

$\delta_0$ means the minimum safety distance, means the minimum time to prevent an accident, $v_{t+1,\hat{l}}$ and $v_{t+1,\hat{f}}$ mean the absolute speed of the leader and follower vehicles in the same lane at time t+1, respectively.

$R_{t,5}$ is a merge reward term. According to this embodiment, the autonomous vehicle $R_{t,5}$ weakens the delayed merging action through $R_{t,5}$, which is defined as follows.

$$R_{t,5} = \begin{cases} \mu_{t+1} \times \zeta_{t+1,\hat{h}}, & \zeta_{t+1,\hat{h}} < 0 \\ 0, & \zeta_{t+1,\hat{h}} \geq 0 \end{cases}$$

Here, $\zeta_{t+1,\hat{h}} \in \zeta_{t+1}$ means the remaining drivable distance from the lane where the autonomous vehicle is located to the merging point.

In other words, the closer the autonomous vehicle merges to the merging point, the higher the penalty is given as it is considered a delayed merge.

$\mu_{t+1}$ is a traffic density weight, which alleviates the penalty due to $R_{t,5}$ when changing lanes is difficult due to high traffic density in the lane, and is defined as follows.

$$\mu_{t+1} = 1 - \left(\frac{\sum_{i=1}^{|C_{t+1,Y}|}(e_i + \delta_0)}{Y}\right)$$

Here, Y means the length of the on-ramp merging zone, $|C_{t+1,Y}|$ means the number of vehicles driving in the main lane of the on-ramp merging zone, and $e_i$ means the length of the ith vehicle in the vehicle set $|C_{t+1,Y}|$ in the main lane of the on-ramp merging zone.

Figure 7:
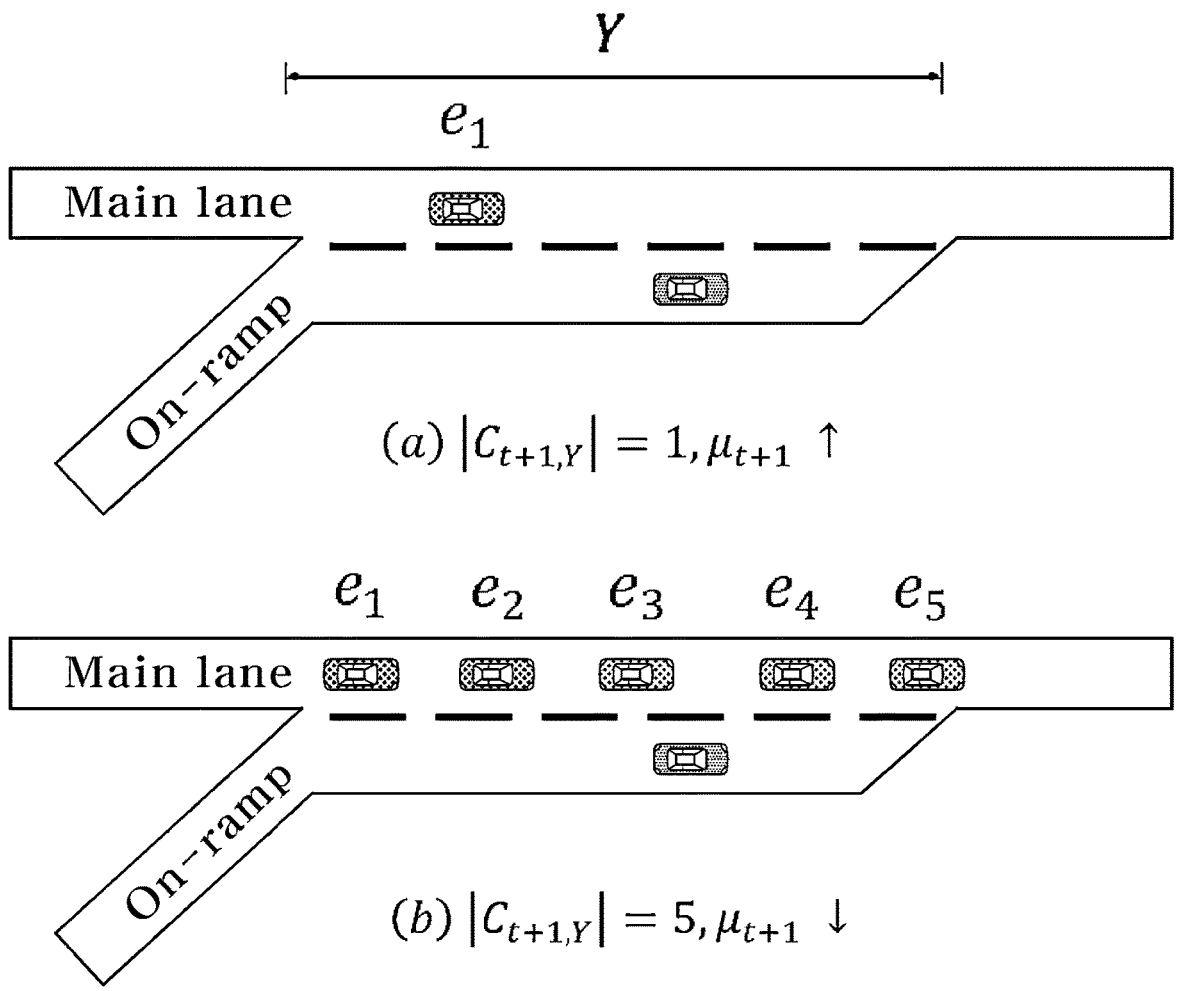
FIG. 7 is a diagram for explaining traffic density weights according to the present embodiment.

FIG. 7 is a diagram for explaining traffic density weights according to this embodiment.

Referring to FIG. 7, the traffic density weight has a value that is inversely proportional to the number of vehicles in the main lane in the on-ramp merging zone, and alleviates the degree of penalty when changing lanes is difficult due to traffic congestion in the main lane.

The last term $R_{t,6}$ is a penalty term related to an accident, which imposes a penalty if a vehicle accident occurs and is defined as follows.

$$R_{t,6} = \begin{cases} -1, & \text{Accident} \\ 0, & \text{Otherwise} \end{cases}$$

Learning of the policy for decision-making by the policy execution unit 104 according to this embodiment can be performed by the autonomous vehicle itself (single autonomous vehicle environment) or by a central server connected to multiple autonomous vehicles through a network.

Figure 8:
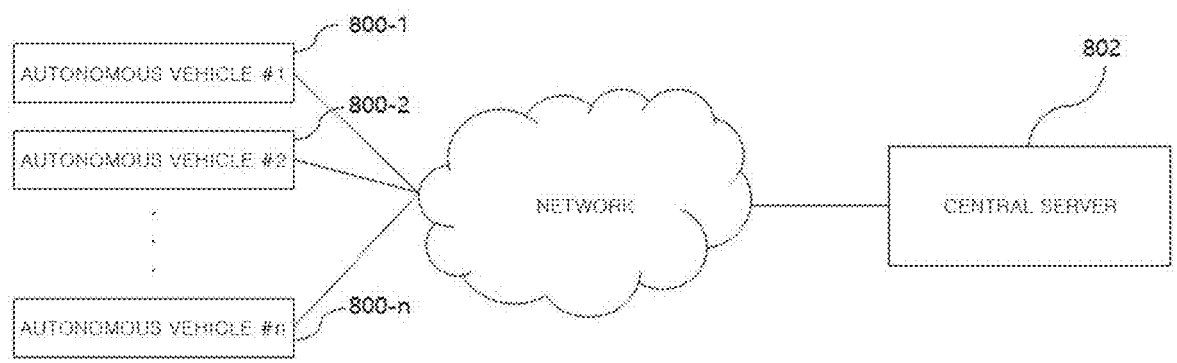
FIG. 8 is a diagram showing the configuration of a system for autonomous vehicles in a multi-autonomous driving environment according to the present embodiment.
Figure 9:
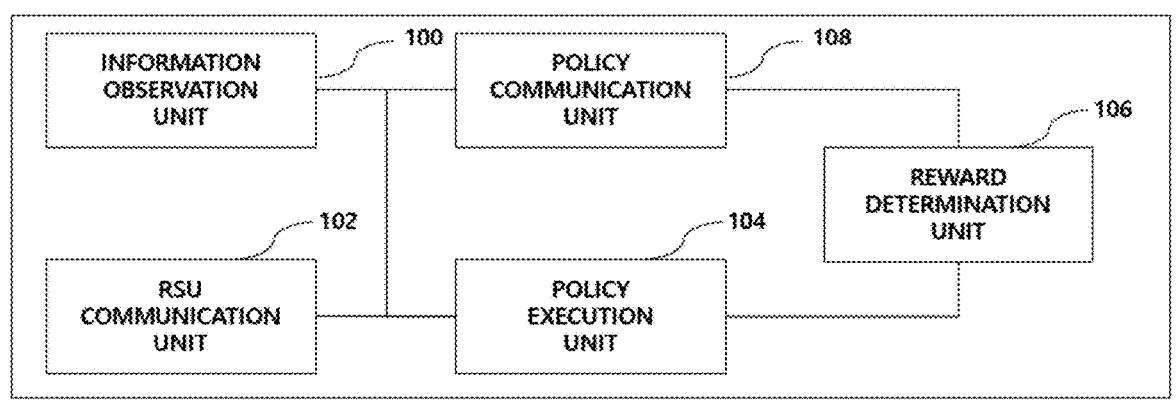
FIG. 9 is a diagram showing the configuration of an autonomous vehicle in a multi-autonomous driving environment.
Figure 10:
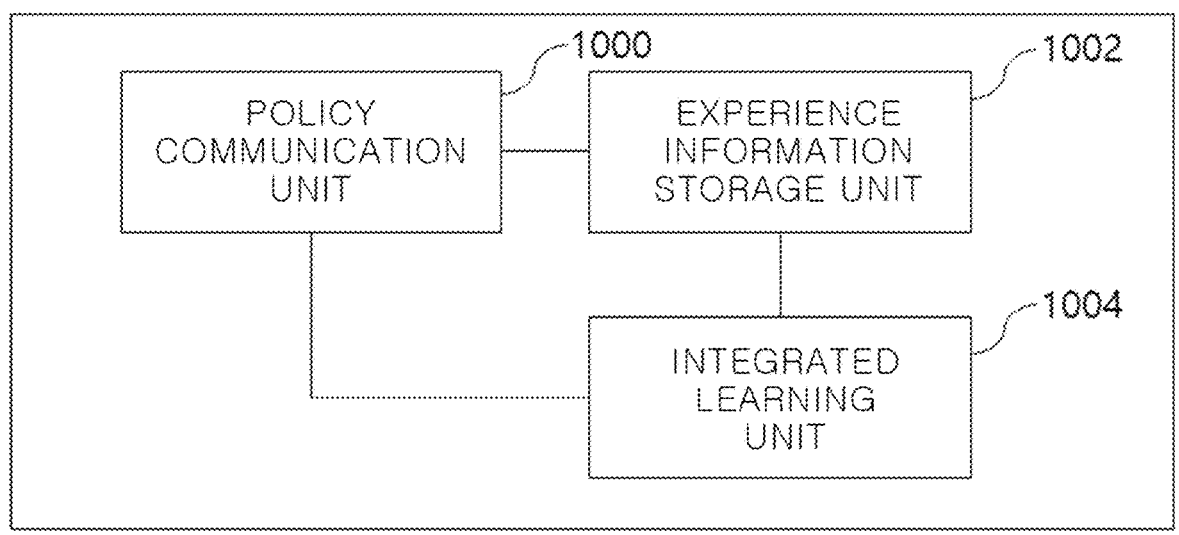
FIG. 10 is a diagram showing the configuration of a central server in a multi-autonomous driving environment.

FIG. 8 is a diagram showing the configuration of a system for an autonomous vehicle in a multi-autonomous driving environment according to this embodiment, FIG. 9 is a diagram showing the configuration of an autonomous vehicle in a multi-autonomous driving environment, and FIG. 10 is a diagram showing the configuration of the central server in a multi-autonomous driving environment.

As shown in FIG. 8, a plurality of autonomous driving apparatuses 800 are connected to the central server 802 through a network.

Here, the network may include wired or wireless Internet and mobile communication networks.

As shown in FIG. 8, the autonomous driving apparatus 800 according to this embodiment may comprise the information observation unit 100, the roadside unit communication unit 102, the policy execution unit 104, and the reward determination unit 106 of FIG. 1. In addition, it may comprise a policy communication unit 108.

In addition, the central server 802 is connected to multiple autonomous driving apparatuses 800 through a network and may comprise a policy communication unit 1000, an experience information storage unit 1002, and an integrated learning unit 1004.

As described above, in a multi-autonomous driving environment, the central server 802 is connected to a plurality of autonomous vehicles 800 through a network, and at this time, policy learning is performed in the integrated central server 802.

Specifically, the individual autonomous vehicle 800 transmits experience information to the central server 802 through the policy communication unit 108. Here, the experience information of the individual autonomous vehicle 800 may include current observation information, current action, next observation information, and reward.

The central server 802 integrates individual experience information received through the policy communication unit 1000 in the experience information storage unit 1002, and the integrated experience information can be used as base data for later policy learning.

The integrated learning unit 1004 of the central server 802 updates the decision-making policy for each autonomous vehicle using experience information from multiple autonomous vehicles based on deep reinforcement learning.

This is not limited to a specific reinforcement learning algorithm and can be comprehensively applied to most algorithms based on deep reinforcement learning methodology. Learning of the policy is repeated a predefined number of times, and the policy updated during the learning process is transmitted to each autonomous vehicle 800 through the policy communication unit 1000.

After receiving the updated policy, the autonomous vehicle 800 makes actual driving decisions at the policy execution unit 104 by inputting observation information obtained through the information observation unit 100 and the roadside unit communication unit 102.

At this time, interaction with the central server and policy communication unit is not considered in the decision-making stage of the autonomous vehicle. Since the learned policy according to this embodiment considers the adaptive target speed in the learning stage, flexible decision-making is possible even in irregular road congestion.

Meanwhile, in a single-driving vehicle environment, the policy communication unit 108 as shown in FIG. 9 is not included, and policy learning can be performed independently by providing a policy learning unit.

Figure 11:
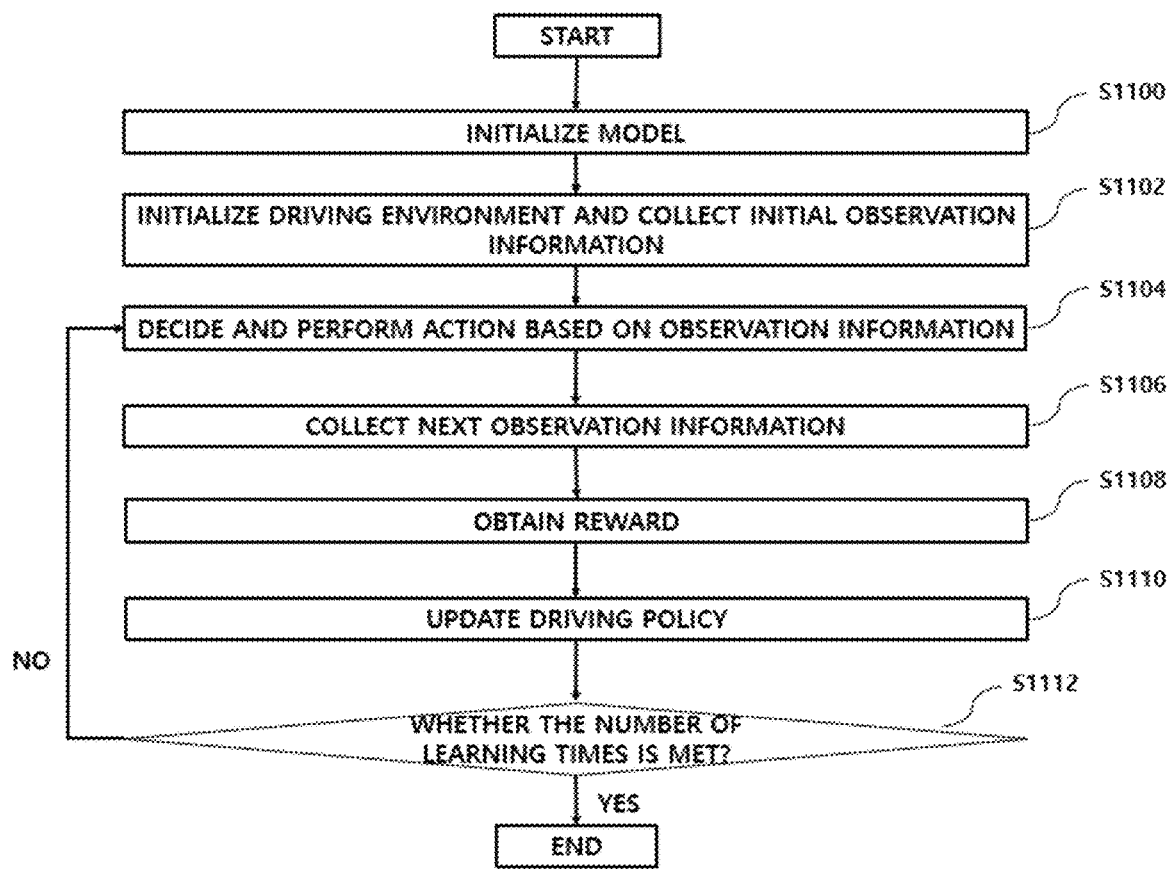
FIG. 11 is a diagram illustrating a policy learning process in a single autonomous vehicle environment according to the present embodiment.

FIG. 11 is a diagram illustrating a policy learning process in a single autonomous vehicle environment according to this embodiment.

FIG. 11 shows the process of learning a policy by an autonomous vehicle itself. Referring to FIG. 11, the apparatus according to this embodiment initializes the model (step 1100), initializes the driving environment, and collects initial observation information (step 1102).

Here, the observation information may be information collected from a sensing module of an autonomous vehicle or a roadside unit.

Afterwards, an action is decided based on the collected observation information (step 1104).

The action decision according to this embodiment includes the acceleration control and the lane change direction determination of the autonomous vehicle in the on-ramp merging zone.

The next observation information is changed by the action decided in step 1104, and the next observation information is collected accordingly (step 1106).

A reward is determined based on the current observation information in steps 1104 and 1106, current action according to the current observation information, and next observation information (step 1108), and the driving policy for decision-making is updated according to the experience information including the determined reward (step 1110).

The apparatus according to this embodiment determines whether the number of learning times is met (step 1112) and ends learning.

Figure 12:
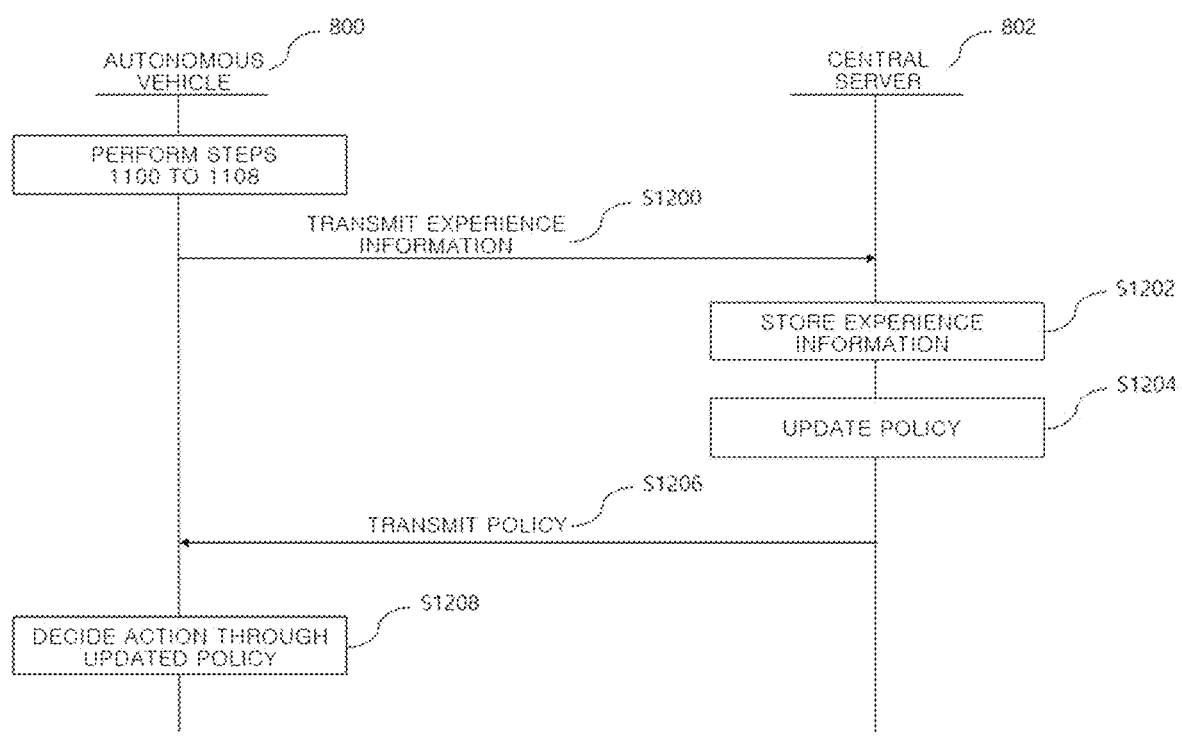
FIG. 12 is a flowchart showing the policy learning process in a multi-autonomous driving environment according to the present embodiment.

FIG. 12 is a flowchart showing the policy learning process in a multi-autonomous driving environment according to this embodiment.

FIG. 12 is a diagram showing the process, in which each autonomous vehicle collects observation information using an initial policy, determines actions and rewards, and then updates the policy at each autonomous vehicle and a central server connected through a network.

Referring to FIG. 12, after performing steps 1100 to 1108 in FIG. 11, the experience information is transmitted to the central server 802 through the policy communication unit 108 (step 1200).

Here, the experience information may include current observation information from each autonomous vehicle, current actions according to the current observation information, next observation information after the current action, and reward using these.

The central server 802 stores experience information (step 1202), samples some of it, and updates the policy for driving the autonomous vehicle (step 1204).

The update of the policy can be performed repeatedly until the preset number of learning times is met.

The central server 802 transmits the updated policy to the autonomous vehicles (step 1206), and each autonomous vehicle performs a decision-making process through the updated policy (step 1208).

Table 1 shows simulation results for the decision-making process according to this embodiment and the conventional decision-making process.

TABLE 1

| Environment | | Average speed(km/h) | |
| --- | --- | --- | --- |
| | | On-ramp AV | Main lane NAV |
| RL-based | PPO | 47.964 ± 3.064 | 44.813 ± 0.118 |
| | DDPG | 47.146 ± 1.617 | 44.772 ± 0.235 |
| | TD3 | 46.626 ± 1.074 | 44.872 ± 0.078 |
| Control-theoretic | | 43.684 ± 0.641 | 43.792 ± 0.23 |

In Table 1, RL-based represents an autonomous vehicle environment that performs learned policies, and Control-theoretic represents a control theory-based autonomous vehicle environment that does not use learned policies.

In RL-based, PPO stands for Proximal Policy Optimization, DDPG stands for Deep Deterministic Policy Gradient, and TD3 stands for Twin Delayed DDPG.

Additionally, On-ramp AV refers to autonomous vehicles in the on-ramp, and Main lane NAV refers to non-autonomous vehicles in the main lane. Referring to Table 1, it can be seen that the RL-based environment according to this embodiment provides an autonomous driving system that minimizes disruption of traffic flow in the main lane because the average speed of non-autonomous vehicles in the main lane is higher compared to the control-theoretic environment.

The aforementioned vehicle action decision method based on deep reinforcement learning for the merging strategy of autonomous vehicles in the on-ramp merging zone may be also implemented in the form of a recording medium containing instructions executable by a computer, such as an application or program module executed by a computer. Computer-readable media can be any available media that can be accessed by a computer and includes both volatile and non-volatile media, removable and non-removable media. Additionally, computer-readable media may include computer storage media. Computer storage media includes both volatile and non-volatile, removable and non-removable media implemented in any method or technology for storage of information such as computer-readable instructions, data structures, program modules, or other data.

The above-described embodiments of the present invention have been disclosed for illustrative purposes, and those skilled in the art will be able to make various modifications, changes, and additions within the spirit and scope of the present invention, and such modifications, changes, and additions should be regarded as falling within the scope of the patent claims below.

The invention claimed is:

1. A deep reinforcement learning-based vehicle action decision apparatus for merging strategy of an autonomous vehicle in an on-ramp merging zone comprising:
    an information observation unit for collecting observation information from a sensing module or roadside unit (RSU) of an autonomous vehicle;
    a policy execution unit for making a decision regarding a current action, including acceleration control and lane change of the autonomous vehicle, based on the current observation information and policy; and a reward determination unit for determining a reward according to the current observation information, the current action, and the next observation information according to the current action, wherein reward in the reward determination unit is determined through a reward term related to speed, lane change, safety distance compliance, and an accident of the autonomous vehicle and a merge reward term related to merge of an autonomous vehicle in the on-ramp merging zone, wherein the closer the autonomous vehicle merges to a merging point, the higher the penalty is given by the reward determination unit as it is considered a delayed merge.

2. The apparatus of claim 1, wherein the observation information comprises at least one of an absolute speed of the autonomous vehicle, a relative speed between the closest leader vehicle in front and the closest follower vehicle in rear among vehicles in each lane that the autonomous vehicle can observe, a relative distance between the leader vehicle and the follower vehicle, a vehicle density for each lane within front observation range of the autonomous vehicle, and presence or absence of a lane within front observation range of the autonomous vehicle.

3. The apparatus of claim 1, wherein the merge reward term is determined using a remaining drivable distance from an on-ramp where the autonomous vehicle is located to a merging point and traffic density.

4. The apparatus of claim 1, wherein the reward determination unit alleviates the penalty using a traffic density weight according to a traffic density of a main lane of the on-ramp merging zone.

5. The apparatus of claim 4, wherein the traffic density weight is determined using at least one of a length of the on-ramp merging zone, the number of vehicles driving in the main lane of the on-ramp merging zone, a length of a vehicle belonging to a vehicle set in the main lane of the on-ramp merging zone, and a minimum safety distance.

6. The apparatus of claim 1, wherein the merge reward term is defined by the following equation, $$R_{t,5} = \begin{cases} \mu_{t+1} \times \zeta_{t+1,\hat{h}}, & \zeta_{t+1,\hat{h}} < 0 \\ 0, & \zeta_{t+1,\hat{h}} \geq 0 \end{cases}$$ [Equation]

wherein $\zeta_{t+1,\hat{h}} \in \zeta_{t+1}$ is the remaining drivable distance from an on-ramp where the autonomous vehicle is located to a merging point, and $\mu_{t+1}$ is a traffic density weight.

7. The apparatus of claim 6, wherein the traffic density weight is defined by the following equation, $$\mu_{t+1} = 1 - \left( \frac{\sum_{i=1}^{|c_{t+1,Y}|}(e_i + \delta_0)}{Y} \right)$$ [Equation]

wherein Y is a length of the on-ramp merging zone, $|c_{t+1,Y}|$ is the number of vehicles driving in a main lane of the on-ramp merging zone, $e_i$ is a length of the ith vehicle in a set of vehicles $|c_{t+1,Y}|$ in a main lane of the on-ramp merging zone, and $\delta_0$ is a minimum safety distance.

8. The apparatus of claim 1, wherein the learning of the policy is performed by the autonomous vehicle itself or by a central server connected to multiple autonomous vehicles through a network.

9. The apparatus of claim 8, when the learning of the policy is performed by the autonomous vehicle itself, further comprises, a policy learning unit for updating the policy according to the collected observation information, the current action, the next observation information, and experience information including the reward, and determining whether the number of learning times is met to learn the policy.

10. The apparatus of claim 8, when the learning of the policy is performed by the central server, further comprises, a policy communication unit for transmitting experience information including the collected current observation information, the current action, the next observation information, and the reward to the central server, and receiving a policy that the central server has learned using experience information received from the multiple autonomous vehicles.

11. A deep reinforcement learning-based vehicle action decision apparatus for merging strategy of an autonomous vehicle in an on-ramp merging zone comprising:

a processor; and a memory connected to the processor, wherein the memory stores program instruction, when executed by the processor, configured to perform operations comprising, collecting observation information from a sensing module or roadside unit (RSU) of an autonomous vehicle;

making a decision regarding a current action, including acceleration control and lane change of the autonomous vehicle, based on the current observation information and policy; and determining a reward according to the current observation information, the current action, and the next observation information according to the current action, wherein a reward is determined through a reward term related to speed, lane change, safety distance compliance, and an accident of the autonomous vehicle and a merge reward term related to a merge of an autonomous vehicle in the on-ramp merging zone, wherein, in the determining the reward, the closer the autonomous vehicle merges to a merging point, the higher the penalty is given as it is considered a delayed merge.

12. A deep reinforcement learning-based vehicle action decision method for merging strategy of an autonomous vehicle in an on-ramp merging zone comprising:

collecting observation information from a sensing module or roadside unit (RSU) of an autonomous vehicle;

making a decision regarding a current action, including acceleration control and lane change of the autonomous vehicle, based on the current observation information and policy; and determining a reward according to the current observation information, the current action, and the next observation information according to the current action, wherein reward is determined through a reward term related to speed, lane change, safety distance compliance, and an accident of the autonomous vehicle and a merge reward term related to a merge of an autonomous vehicle in the on-ramp merging zone, wherein, in the determining the reward, the closer the autonomous vehicle merges to a merging point, the higher the penalty is given as it is considered a delayed merge.

13. The method of claim 12, wherein the merge reward term is determined according to at least one of the remaining drivable a distance from an on-ramp where the autonomous vehicle is located to a merging point and traffic density.

\* \* \* \* \*